(12) United States Patent
Mclaughlin (10) Patent No.: US 10,344,624 B2
(45) Date of Patent: Jul. 9, 2019

(54) CAPTIVE COMPONENT ON A FASTENER

(71) Applicant: Rolls-Royce Corporation, Indianapolis, IN (US)

(72) Inventor: William J. Mclaughlin, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 684 days.

(21) Appl. No.: 14/991,655

(22) Filed: Jan. 8, 2016

(65) Prior Publication Data

US 2016/0201517 A1 Jul. 14, 2016

Related U.S. Application Data

(60) Provisional application No. 62/102,750, filed on Jan. 13, 2015.

(51) Int. Cl.
*F01D 25/28* (2006.01)
*F16B 5/02* (2006.01)
(Continued)

(52) U.S. Cl.
CPC ............ *F01D 25/28* (2013.01); *F16B 5/0225* (2013.01); *F16B 31/04* (2013.01); *F16B 41/002* (2013.01);
(Continued)

(58) Field of Classification Search
CPC ........ F01D 25/243; F01D 25/28; F16B 2/065; F16B 5/0216; F16B 5/0225; F16B 5/0233; F16B 5/0241; F16B 9/023; F16B 31/04; F16B 35/041; F16B 35/044; F16B 35/048; F16B 41/002; F16B 2200/506; F16D 1/033; F16D 1/076; Y10T 29/49947; Y10T 29/49948; Y10T 403/1616;
(Continued)

(56) References Cited

U.S. PATENT DOCUMENTS

| | | | | |
|---|---|---|---|---|
| 3,556,570 A | * | 1/1971 | Cosenza | F16B 41/002 411/999 |
| 5,687,537 A | * | 11/1997 | Noble | H01Q 1/1242 403/337 |
| 5,697,650 A | * | 12/1997 | Brown | B05B 15/658 285/197 |
| 6,019,556 A | | 2/2000 | Hess | |

(Continued)

FOREIGN PATENT DOCUMENTS

| | | | | |
|---|---|---|---|---|
| DE | 19615205 A1 | | 10/1996 | |
| DE | 102009009836 A1 | * | 9/2010 | ............ F16B 41/002 |

OTHER PUBLICATIONS

"Fundamentals of Basic Bolting." SmartBolts. Aug. 8, 2013, [online], [retrieved on Jul. 18, 2018]. Retrieved from the Internet <URL: https://web.archive.org/web/20130808002217/http://www.smartbolts.com/fundamentals-part-2>.*

(Continued)

*Primary Examiner* — Josh Skroupa (74) *Attorney, Agent, or Firm* — Fishman Stewart PLLC (57) ABSTRACT

An exemplary pre-assembled fastener device may include a bushing attached to a bolt fastener before the fastener device is used to attach two or more components to one another. The bolt fastener may have an external thread, and the bushing may have an internal thread that is configured to fasten to the external thread. The internal thread may have a profile including a flat crest configured to be spaced apart from the bolt fastener.

20 Claims, 5 Drawing Sheets

(51) Int. Cl.
*F16B 41/00* (2006.01)
*F16B 31/04* (2006.01)

(52) U.S. Cl.
CPC ... *F16B 2200/506* (2018.08); *Y10T 29/49948* (2015.01)

(58) Field of Classification Search
CPC ......... Y10T 403/1624; Y10T 403/3906; Y10T 403/3926; Y10T 403/3933; Y10T 403/645; Y10T 403/648; Y10T 403/7067; Y10T 403/7069; Y10T 403/71; Y10T 403/7123

USPC .... 411/999; 403/13, 14, 188, 191, 192, 337, 403/338, 374.3, 374.4, 384, 388; 29/525.01, 525.02
See application file for complete search history.

(56) References Cited

U.S. PATENT DOCUMENTS

| | | | |
|---|---|---|---|
| 6,663,375 B1 | 12/2003 | Ulcej | |
| 6,884,014 B2 | 4/2005 | Stone et al. | |
| 7,048,487 B2 | 5/2006 | Stone | |
| 8,905,693 B2* | 12/2014 | Coffland | F16B 2/241 411/999 |
| 9,511,544 B2* | 12/2016 | Hemingway | F16B 5/0233 |
| 9,752,506 B2* | 9/2017 | Schwartz | F01D 25/243 |
| 2009/0047094 A1 | 2/2009 | Stone et al. | |
| 2011/0008125 A1 | 1/2011 | Moon et al. | |
| 2011/0142565 A1 | 6/2011 | Pudvah | |
| 2015/0086379 A1* | 3/2015 | Pentony | B63H 1/26 416/247 A |

OTHER PUBLICATIONS

European Search Report, dated May 23, 2016, 3 pages.
English Abstract of DE196152, 1 page.

* cited by examiner

CAPTIVE COMPONENT ON A FASTENER

CROSS-REFERENCE TO RELATED APPLICATIONS

This application claims priority to U.S. Provisional Patent Application No. 62/102,750 filed on Jan. 13, 2015, the contents of which are hereby incorporated by reference in its entirety.

GOVERNMENT RIGHTS

This disclosure was made with government support under Contract Number N00019-04-C-0102 awarded by the Department of the Navy. The government has certain rights in the disclosure.

FIELD OF TECHNOLOGY

The present disclosure relates to fastener devices and more particularly, but not exclusively, to a fastener device having a bushing attached to a bolt fastener in a pre-assembled configuration.

BACKGROUND

Gas turbine engine manufacturers continuously investigate tools and processes for efficiently producing engines. As one example, a fuel manifold for distributing fuel to a combustor of gas turbine engine may include a plurality of tube clamps configured to attach metal tubes to hose fitting inserts or brackets. A bolt fastener is typically used in combination with a bushing to tighten each tube clamp around the respective tube. In particular, the bolt fasteners and the bushings typically are separate parts that are carried to the engine, such that the bushing can be held within an aperture of a bracket and the bolt fastener can be inserted through the bushing and the aperture of the bracket so as to engage female thread of the clamps. For this reason, the bushings may become separated from the bolt fasteners, and in one example, the bushing may be irretrievably dropped into inaccessible sections of the engine thus causing damage to the engine over its service life.

It would therefore be helpful to provide a fastener device that is configured to secure a bushing and a bolt fastener to one another as a single unit in a pre-assembled configuration, thus preventing either part from being separated from the other.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

An exemplary pre-assembled fastener device and an exemplary method for using the fastener device are described herein and are shown in the attached drawings. The fastener device has a pre-assembled configuration including a bushing attached to a bolt fastener before the fastener device is used to attach two or more components to one another. An exemplary advantage of this pre-assembled configuration is the reduced probability that the bushing will be inadvertently separated from the bolt fastener and irretrievably lost in, for example, another portion of the engine only to later cause damage to components of the engine over its service life. In one non-limiting example, the fastener device can be configured to secure metal tubing of a fuel manifold in a gas turbine engine. However, other examples of the fastener device can be utilized to attach various other components of any suitable system. More specifically, in the present example, the bolt fastener can have an external thread, and the bushing can have an internal thread that is configured to fasten to the external thread before the fastener device attaches the metal tubing and a bracket of the manifold to one another. Moreover, the internal thread has a profile including a flat crest that is configured to be spaced apart from the bolt fastener, thus preventing the bushing and bolt fastener from interfering with one another when the fastener device attaches the components to one another and permitting considerably narrow tolerances between those components.

Another exemplary illustration includes a method for using the exemplary fastener device to attach two or more components to one another, without inadvertently losing a portion of the fastener device prior to attaching the components to one another. The method includes producing a bushing, which has an internal thread configured to have a profile including a flat crest. The method further includes the step of fastening the internal thread to an external thread of a bolt fastener in a pre-assembled configuration, before the fastener device is used to attach the components to one another. Additionally, the external thread of the bolt fastener is detached from the internal thread of the bushing and then fastened to a female thread of one or more of the components, thus attaching those components to one another. Moreover, the internal thread of the bushing can be spaced apart from the bolt fastener to prevent interference between the bushing and the bolt fastener thus permitting narrow tolerances between the components that are attached to one another.

Figure 1:
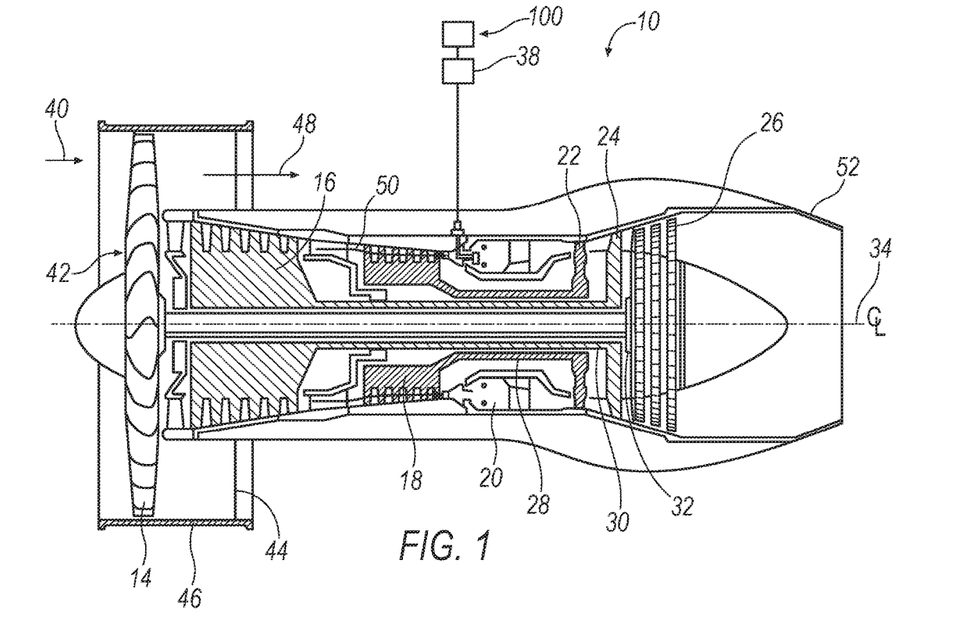
FIG. 1 schematically illustrates some aspects of one non-limiting example of a gas turbine engine including a fuel manifold having pre-assembled fastener devices configured to attach metal tubing to mounting brackets, in accordance with one non-limiting exemplary embodiment of the present disclosure.

FIG. 1 illustrates a gas turbine engine 10, which includes a fan 12, a low pressure compressor 14 ("LP compressor"), an intermediate pressure compressor 16 ("IP compressor"), a high pressure compressor 18 ("HP compressor"), a combustor 20, a high pressure turbine 22 ("HP turbine"), an intermediate pressure turbine 24 ("IP turbine") and a low pressure turbine 26 ("LP turbine"). The HP compressor 18, the IP compressor 16 and the LP compressor 14 are connected to a respective one of an HP shaft 28, an IP shaft 30 and an LP shaft 32, which in turn are connected to a respective one of the HP turbine 22, the IP turbine 24 and the LP turbine 26. The shafts extend axially and are parallel to a longitudinal center line axis 34. While FIG. 1 illustrates a three shaft engine, it will be appreciated that other embodiments can have configurations including more or less than three shafts. During general operation of the engine 10, ambient air 40 enters the fan 12 and is directed across a fan rotor 42 in an annular duct 44, which in part is circumscribed by fan case 46. The bypass airflow 48 provides a fraction of engine thrust while the primary gas stream 50 is directed to the combustor 20 and the turbines 20, 22, 24, and then exhausted through a nozzle 52 generating thrust. Additionally, the engine 10 further includes a fuel manifold 38. The fuel manifold 38 includes multiple hoses or metal tubing, which are attached to hose fittings or brackets within the engine 10 by pre-assembled fastener devices 100. Exemplary benefits of these fastener devices can include the manufacture of fuel manifolds and gas turbine engines within considerably narrow tolerances, and additional exemplary benefits can include the reduced probability of fastener components being dropped and lost within the engine during assembly, which could damage the engine over its service life. However, the fastener device can instead be configured to attach any components of the fuel manifolds to one another or attach any two or more components of other systems within the gas turbine engines or other larger structures.

Figure 2:
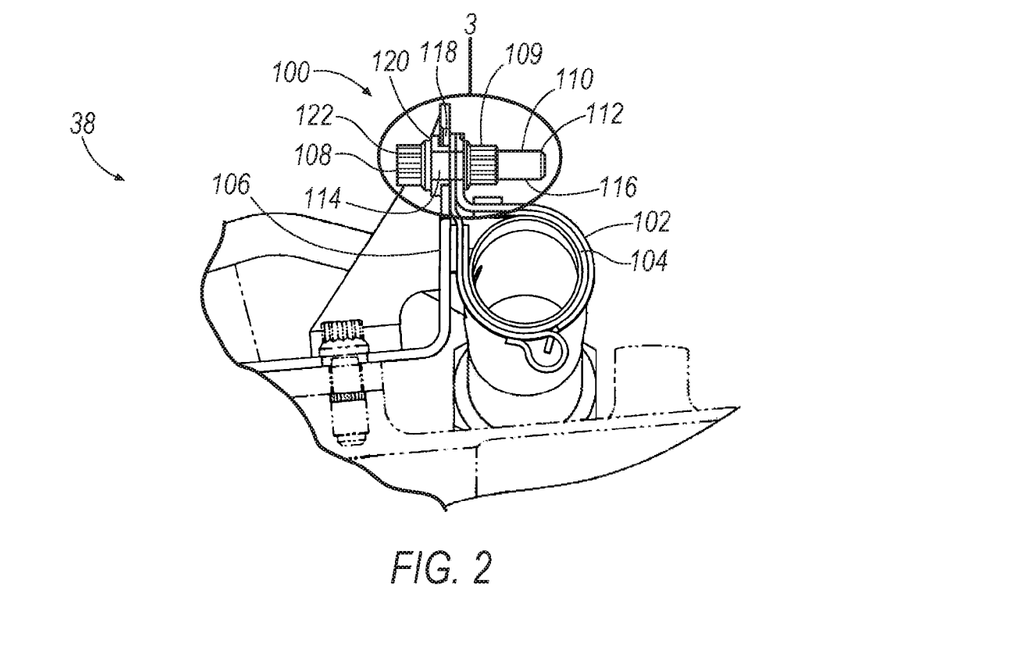
FIG. 2 is a cross-sectional view of one portion of the fuel manifold of FIG. 1, having the fastener device.
Figure 3:
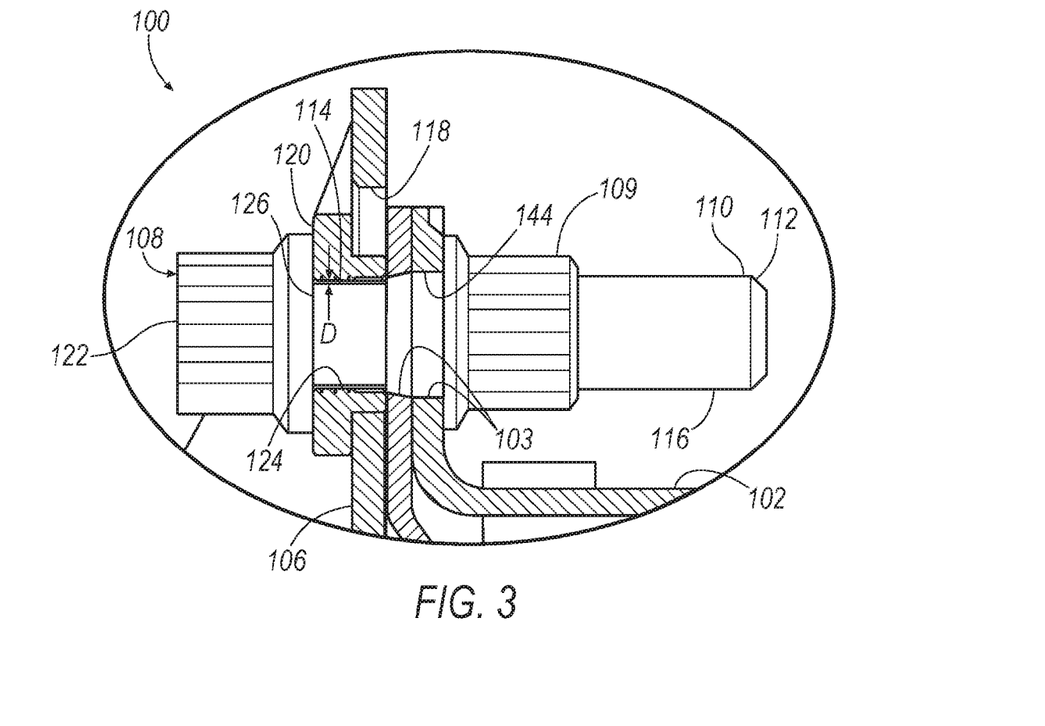
FIG. 3 is an enlarged view of an encircled portion of the fastener device of FIG. 2.

Referring now to FIGS. 2 and 3, there are illustrated enlarged cross-sectional views of one portion of the exemplary fuel manifold 38, which includes a fastener device 100 configured to attach two or more components of the manifold 38 to one another. The fastener device 100 has multiple parts that are configured to be pre-assembled or attached to one another as a single unit before the device 100 is used to install the manifold to the outer combustor case of the engine, thus preventing one or more of the parts from being lost. In addition, when the fastener device is used to assemble the manifold, the parts of the fastener device are configured to provide clearance from another one of its parts, thus preventing interference between the parts and providing narrow tolerances of the manifold after it has been constructed. More specifically, in one example, the fuel manifold 38 can include a tube clamp 102, a tube 104, a bracket 106 and the fastener device 100. Of course, the manifold 38 can include more than one tube, and each tube can be mounted to multiple brackets using a series of corresponding clamps and fastener devices.

Each one of the fastener devices 100 is configured to tighten the corresponding tube clamp 102 and attach the tube 104 to the bracket 106. In particular, as best shown in FIG. 3, each one of the fastener devices 100 includes a bolt fastener 108, a nut 109 and a bushing 120. The bracket 106 has a slot 118 configured to receive a partially threaded shank 110 of the bolt 108. The slot 118 is configured to permit the bolt fastener 108 to slide therein, in response to thermal differentials of the hot outer combustor case, as compared to the cooler fuel manifold. A head 122 of the bolt fastener 108 and the bushing 120 adjacent to the head 122 are disposed on one side of the bracket 106. The bushing 120 has a flange 121 including an outer diameter that is greater than a width of the slot 118, so as to prevent the bolt fastener 108 from being pulled entirely through the slot 118 during a high loading condition. The bushing 120 further includes a neck 123, which extends from the flange 121 and is configured to provide an interface between the bolt fastener 108 and the bracket 108. For instance, the neck 123 can be a sleeve, which extends from the flange 121 and has an outer diameter that is less than a width of the slot 118, such that the outer surface of the sleeve contacts the inner edge of the slot 118 and freely slides within the slot 118. One exemplary benefit of this configuration is that wear on the bracket can be reduced, during engine vibration and thermal expansion of the components. Moreover, the tube clamp 102 and the tube 104 are disposed on the other side of the bracket 106, and the tube clamp 102 has a pair of holes 103 configured to receive the threaded portion 112 of the shank 110, such that the bolt fastener 108 threadably engages the nut 109 on an opposing side of the tube clamp 102.

The shank 110 is configured to attach the bushing 120 and the bolt fastener 108 to each other, before the fastener device 100 installs the manifold to the engine, thus preventing one of the parts from being lost before the fastener device 100 is used to install the manifold to the engine. In particular, an end of the shank 110 that is opposite to a head 122 of the bolt fastener 108 has a threaded portion 112 including an external thread 116, and the external thread 116 is configured to engage internal threading of the bushing 120. Of course, the fastener device can have other configurations that attach the bolt fastener and the bushing to one another. One exemplary benefit of these configurations is eliminating the risk of dropping a somewhat small bushing into the engine, which may damage the engine over its service life. During assembly, the internal threading is detached from the external thread 116, and the bushing 120 is moved toward the head 122 of the bolt fastener 108.

The shank 110 is further configured to provide clearance between the bolt fastener 108 and the bushing 120, when the fastener device 100 is used to install the manifold to the engine, thus preventing the bushing 120 from interfering with the clamping force between the bolt fastener 108 and the nut 109. In particular, the external thread 116 of the shank 110 has a maximum outer diameter, and a non-threaded portion 114 of the shank 110 has a maximum outer diameter, which is less than the maximum outer diameter of the external thread 116. While the threaded portion 112 is sufficiently sized to engage internal threading of the bushing 120, there is clearance between the non-threaded portion 114 and the bushing 120, thus providing clearance between the bolt fastener 108 and the bushing 120. The head 122 of the bolt fastener 108 is spaced apart from the external thread 116, with the non-threaded portion 114 disposed between the head 122 and the threaded portion 112. Additionally, the non-threaded portion 114 of the shank 110 is longer than the internal thread 124 of the bushing 120, so as to more quickly threadably detach the bushing 120 from the bolt fastener 108 during assembly. However, in other exemplary embodiments, the fastener device can have other suitable configurations that provide clearance between the bolt fastener and the bushing when the fastener device installs the manifold to the engine. For instance, the bolt fastener can be a fully threaded fastener including a shank that has an external thread extending along the entire length of the shank.

Figure 4:
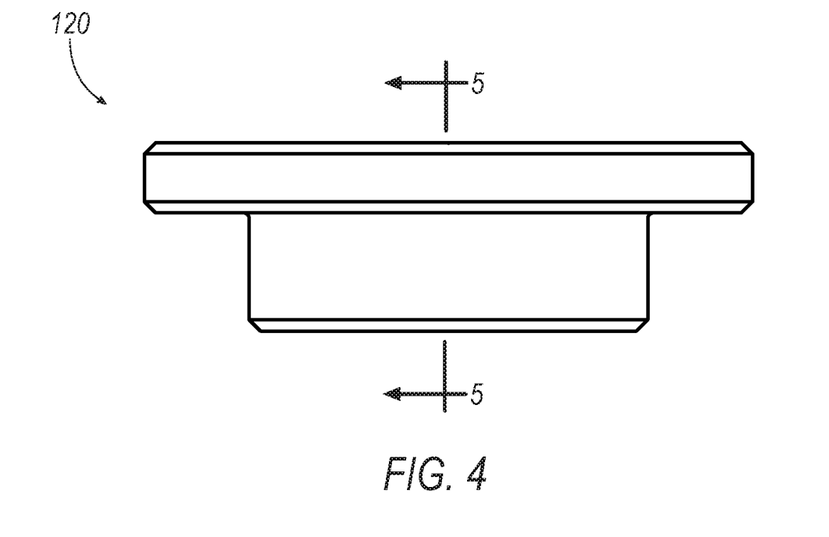
FIG. 4 is a side view of the bushing of FIG. 3.
Figure 5:
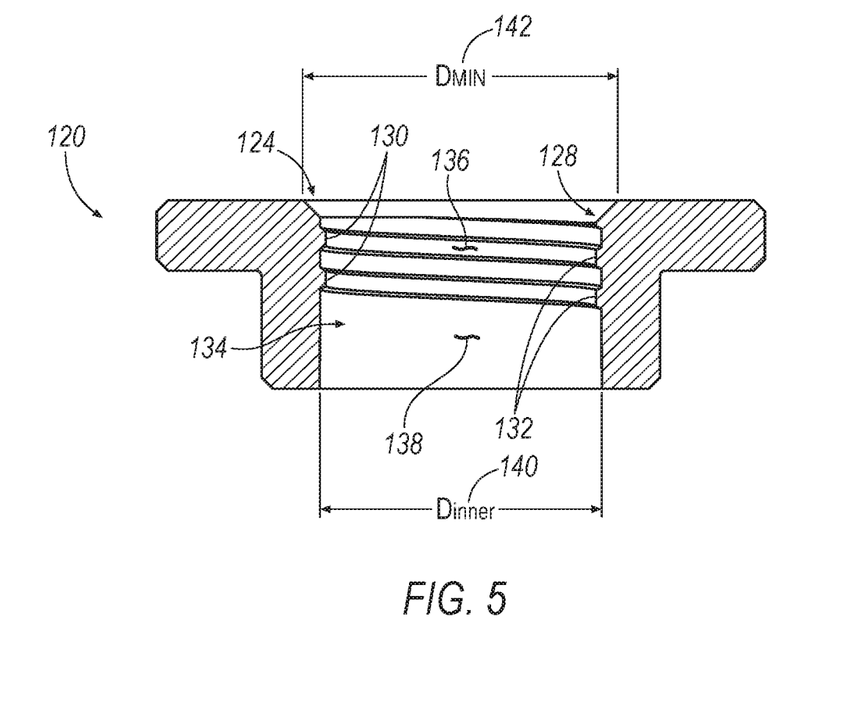
FIG. 5 is a cross-sectional view of the bushing of FIG. 4, as taken along line 5-5 and showing that the bushing is partially threaded.

Referring to FIGS. 3 through 5, the fastener device 100 includes the bushing 120, which has the internal thread (FIG. 5). The internal thread 124 is configured to fasten to the external thread 116 of the bolt fastener 108 (FIGS. 2 and 3) only before the fastener device 100 attaches the components to one another. Specifically, the internal thread 124 has a profile 128 including a flat crest 130 (FIG. 5) that is configured to be spaced apart from the bolt fastener 108 by a distance D (FIG. 3) when the fastener device 100 attaches the components to one another. Similarly, the bolt fastener 100 is configured such that the non-threaded portion 114 of the shank 110 is spaced apart concentrically inward from the internal thread 124. Thus, when the fastener device 100 is used to attach the components to one another, there is no interference between the bolt fastener and the bushing, such that the components of the fuel manifold 38 can be assembled together and held in position within substantially narrow tolerances. In this example, the flat crest 130 of the internal thread 124 is a drilled bore surface 132 formed by drilling or shearing off the apexes of a previously cut internal thread.

Referring to FIG. 5, the bushing 120 has a partially tapped bore 134, including a tapped portion 136 having the internal thread 124 formed therein and a non-tapped portion 138. The non-tapped portion 138 has an inner diameter surface 140 that is less than a minimum inner diameter 142 of the internal thread 124.

Figure 6:
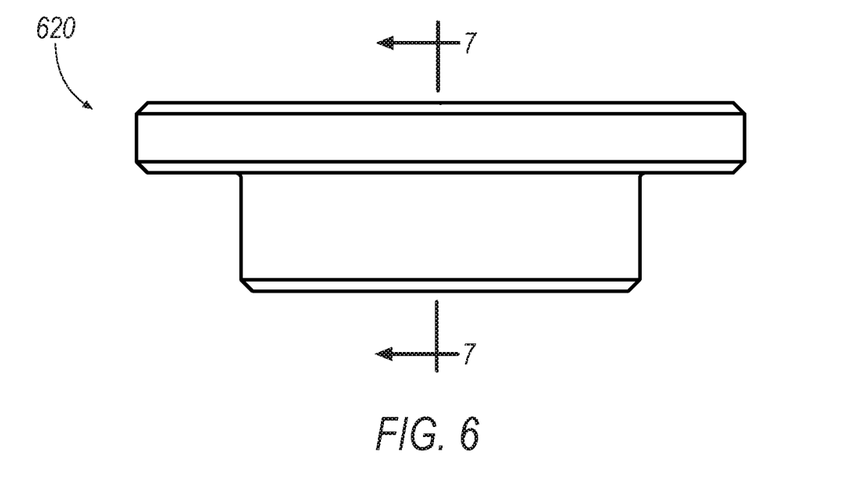
FIG. 6 is a side view of another non-limiting exemplary bushing.
Figure 7:
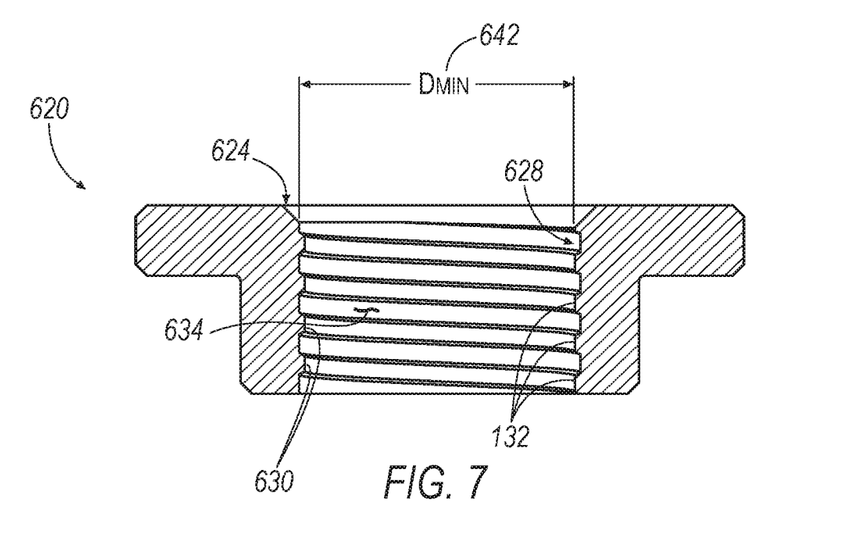
FIG. 7 is a cross-sectional view of the bushing of FIG. 6, as taken along line 7-7 and showing that the bushing is fully threaded.

Referring to FIGS. 6 and 7, there is illustrated another exemplary bushing 620, which has a fully tapped bore 634, as compared to the partially tapped bore 134 shown in FIG. 5. In particular, the bushing 620 includes an inner diameter surface 640 and an internal thread 624 that extends along the entire length of the bushing 620. Thus, the bushing 620 having a fully tapped bore can be more secured to a bolt fastener, as compared to the bushing 120 having a partially tapped bore.

Figure 8:
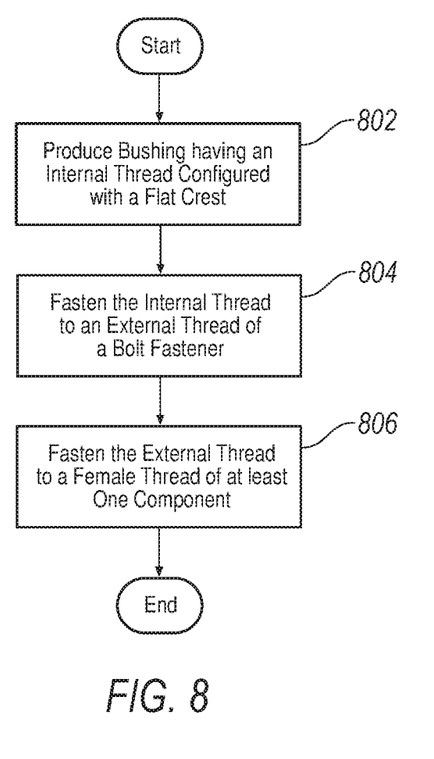
FIG. 8 is a flow chart of a non-limiting exemplary process for using the fastener device of FIG. 2.

Referring to FIG. 8, there is shown a flow chart of an exemplary method 800 for using the fastener device 100 of FIGS. 2 through 5, to attach a plurality of components to one another. The method includes the step of producing the bushing 120 having the internal thread 124 configured to have the profile 128 with the flat crest 130. This can be accomplished by cutting an internal thread in the bushing and then drilling or shearing the apexes of the internal thread.

At step 802, the internal thread 124 of the bushing 120 is fastened to the external thread 116 of the bolt fastener 108 before the fastener device 100 attaches the components to one another. The pre-assembled fastener device 100 is then carried to an attachment point between the components, without the bushing 120 being separated and dropped from the bolt fastener 108.

At step 804, the external thread 116 of the bolt fastener 108 is fastened to a female thread 144 of at least one of the components when the fastener device attaches the components to one another. In particular, the bolt fastener 108 is inserted through the slot 118 in the bracket 106, and the external thread 116 is fastened to the female thread 144 of the tube clamp 102, such that the tube clamp 102 can be tightened around the tube 104. The internal thread 124 of the bushing 120 is also detached from external thread 116 of the bolt fastener 108, thus spacing apart the internal thread 124 of the bushing 120 from the bolt fastener 108 when the fastener device 100 attaches the components to one another.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

What is claimed as new and desired to be protected by Letters Patent of the United States is:

1. A fastener device for attaching a plurality of components to one another, the fastener device comprising:
    a bolt fastener having an external thread; and
    a bushing having an internal thread that is configured to fasten to the external thread of the bolt fastener before the fastener device attaches the components to one another, the bushing further having a flange and a neck extending from the flange;
    wherein the internal thread has a profile including a flat crest that is configured to be spaced apart from the bolt fastener when the fastener device attaches the components to one another.

2. The fastener device of claim 1, wherein the internal thread is configured to fasten to the external thread of the bolt fastener only before the fastener device attaches the components to one another.

3. The fastener device of claim 1, wherein the bolt fastener comprises:
    a partially threaded shank including a threaded portion having the external thread formed thereon and a non-threaded portion; and
    a head that is formed on an end of the non-threaded portion of the shank, and the head is spaced apart from the external thread.

4. The fastener device of claim 3, wherein the non-threaded portion of the shank has an outer diameter that is less than a maximum outer diameter of the external thread.

5. The fastener device of claim 3, wherein the bolt fastener is configured to space apart from the non-threaded portion of the shank concentrically inward from the internal thread of the bushing when the fastener device attaches the components to one another.

6. The fastener device of claim 3, wherein the non-threaded portion of the shank has a length that is greater than a length of the internal thread.

7. The fastener device of claim 1, wherein the flat crest of the internal thread is a drilled bore surface.

8. The fastener device of claim 1, wherein the bushing includes a tapped portion having the internal thread formed therein, and the bushing further includes a non-tapped portion.

9. The fastener device of claim 8, wherein the non-tapped portion has an inner diameter that is greater than a minimum inner diameter of the internal thread.

10. The fastener device of claim 1, wherein the bushing is a fully threaded bushing including an inner diameter surface and the internal thread extends along the entire length of the bushing.

11. A fluid delivery system for a gas turbine engine, comprising:
    a plurality of components including a bracket, a clamp and a hose disposed within the clamp; and
    a fastener device configured to tighten the clamp on the hose and attach the hose to the bracket;
    wherein the fastener device includes a bolt fastener having an external thread;
    wherein the fastener device includes a bushing having an internal thread that is configured to fasten to the external thread of the bolt fastener before the fastener device attaches the components to one another, the bushing further having a flange and a neck extending from the flange;

wherein the internal thread has a profile including a flat crest that is configured to be spaced apart from the bolt fastener when the fastener device attaches the components to one another.

12. The fluid delivery system of claim 11, wherein the bracket includes a slot configured to receive the bolt fastener.

13. The fastener device of claim 12, wherein the flange has an outer diameter that is greater than a width of the slot, and the neck has an outer diameter that is less than a width of the slot.

14. The fluid delivery system of claim 11, wherein the clamp and the hose are disposed on one side of the bracket, and the bushing and a head of the bolt fastener are disposed on the other side of the bracket.

15. The fastener device of claim 11, wherein the internal thread is configured to fasten to the external thread of the bolt fastener only before the fastener device attaches the components to one another.

16. The fastener device of claim 11 wherein the bolt fastener comprises:
a partially threaded shank including a threaded portion having the external thread formed thereon and a non-threaded portion; and
a head that is formed on an end of the non-threaded portion of the shank, and the head is spaced apart from the external thread.

17. The fastener device of claim 16, wherein the non-threaded portion of the shank has an outer diameter that is less than a maximum outer diameter of the external thread.

18. The fastener device of claim 16, wherein the bolt fastener is configured to space apart from the non-threaded portion of the shank concentrically inward from the internal thread of the bushing when the fastener device attaches the components to one another.

19. A method for using a fastener device to attach a plurality of components to one another, the method comprising:
producing a bushing that includes an internal thread configured to have a profile including a flat crest, the bushing further having a flange and a neck extending from the flange;
fastening the internal thread of the bushing to an external thread of a bolt fastener before the fastener device attaches the components to one another;
detaching the internal thread of the bushing from external thread of the bolt fastener when the fastener device attaches the components to one another; and
fastening the external thread of the bolt fastener to a female thread of at least one of the components when the fastener device attaches the components to one another.

20. The method of claim 19, further comprising:
inserting the bolt fastener through a slot formed in a bracket;
spacing apart the internal thread of the bushing from the bolt fastener when the fastener device attaches the components to one another;
attaching the external thread of the bolt fastener to the female thread formed on a clamp; and
tightening the clamp around one of the components.

* * * * *